US008836671B2

(12) United States Patent
Takahashi et al.

(10) Patent No.: US 8,836,671 B2
(45) Date of Patent: Sep. 16, 2014

(54) POSITION DETECTION DEVICE, ELECTRONIC APPARATUS, AND DISPLAY DEVICE

(75) Inventors: Masaki Takahashi, Suwa (JP); Yasunori Onishi, Shiojiri (JP)

(73) Assignee: Seiko Epson Corporation (JP)

( * ) Notice: Subject to any disclaimer, the term of this patent is extended or adjusted under 35 U.S.C. 154(b) by 278 days.

(21) Appl. No.: 13/152,722

(22) Filed: Jun. 3, 2011

(65) Prior Publication Data

US 2011/0304591 A1 Dec. 15, 2011

(30) Foreign Application Priority Data

Jun. 11, 2010 (JP) ................................. 2010-133675

(51) Int. Cl.
*G06F 3/042* (2006.01)
(52) U.S. Cl.
CPC .... *G06F 3/0428* (2013.01); *G06F 2203/04101* (2013.01)
USPC .......................................................... 345/175
(58) Field of Classification Search
CPC ... G06F 1/1637; G06F 1/1616; G06F 1/1677; G06F 1/1684; G06F 3/011; G06F 3/0428; G06F 3/0425; G06F 3/0421; G06K 9/209; B65H 2253/42
USPC .................... 345/173–178; 178/18.01–20.04; 359/142; 330/278; 356/4.01, 4.06–4.08
See application file for complete search history.

(56) References Cited

U.S. PATENT DOCUMENTS

| | | | | |
|---|---|---|---|---|
| 4,482,245 A | * | 11/1984 | Makabe et al. | 356/30 |
| 4,688,933 A | * | 8/1987 | Lapeyre | 356/3.16 |
| 5,103,085 A | * | 4/1992 | Zimmerman | 250/221 |
| 8,411,068 B2 | * | 4/2013 | Lu et al. | 345/175 |
| 8,446,392 B2 | * | 5/2013 | Wang et al. | 345/175 |
| 2002/0030668 A1 | * | 3/2002 | Hoshino et al. | 345/175 |
| 2002/0118177 A1 | * | 8/2002 | Newton | 345/173 |
| 2006/0132432 A1 | * | 6/2006 | Bell | 345/156 |
| 2006/0139314 A1 | * | 6/2006 | Bell | 345/156 |
| 2007/0165007 A1 | * | 7/2007 | Morrison et al. | 345/175 |
| 2008/0129700 A1 | * | 6/2008 | Morrison | 345/173 |
| 2009/0189878 A1 | * | 7/2009 | Goertz et al. | 345/175 |
| 2010/0013860 A1 | * | 1/2010 | Mandella et al. | 345/650 |
| 2010/0060570 A1 | * | 3/2010 | Underkoffler et al. | 345/156 |
| 2010/0134447 A1 | * | 6/2010 | Nakajoh | 345/175 |
| 2010/0224767 A1 | * | 9/2010 | Kawano et al. | 250/216 |
| 2011/0043826 A1 | * | 2/2011 | Kiyose | 356/614 |

FOREIGN PATENT DOCUMENTS

| | | |
|---|---|---|
| JP | 2000-267798 A | 9/2000 |
| JP | 2001-082923 | 3/2001 |
| JP | 2001-082923 A | 3/2001 |
| JP | 2001-142643 | 5/2001 |
| JP | 2006-018567 A | 1/2006 |

* cited by examiner

*Primary Examiner* — Alexander Eisen
*Assistant Examiner* — Sanjiv D Patel
(74) *Attorney, Agent, or Firm* — Harness, Dickey & Pierce, P.L.C.

(57) ABSTRACT

A display device includes a screen on which an image is displayed, and a position detection device including a light emitting section adapted to emit an irradiation light beam along the screen, a light receiving section adapted to receive a reflected light beam caused by an object reflecting the irradiation light beam, and a detection section adapted to detect position information of the object based on a light reception result of the light receiving section, wherein the position detection device has detection accuracy of the position information of the object varying in accordance with a position of the object in a direction intersecting the screen.

14 Claims, 11 Drawing Sheets

POSITION DETECTION DEVICE, ELECTRONIC APPARATUS, AND DISPLAY DEVICE

BACKGROUND

1. Technical Field

The present invention relates to a position detection device, an electronic apparatus, a display device, and so on.

2. Related Art

In the electronic devices such as a cellular phone, a personal computer, a car navigation device, a ticket-vending machine, or a banking terminal, there is used in recent years a display device provided with a position detection function having a touch panel disposed on the front surface of the display section. According to the display device, it becomes possible for the user to point an icon or the like in a display image or input information while referring to the image displayed on the display section. As a position detection method using such a touch panel, there are known a resistive film type and a capacitance type, for example.

On the other hand, the display devices for projection display devices (projectors) and digital signage have a larger display area compared to the display devices for cellular phones and personal computers. Therefore, in these display devices, it is difficult to realize the position detection using the resistive touch panels and the capacitance touch panels described above.

As the related art of the position detection device for the projection display devices, there is known a technology disclosed in JP-A-2001-142643, for example. However, the position detection device has a problem that the power consumption increases as the detection area is broadened.

Further, as the method of reducing the power consumption of the position detection device, there is known a method disclosed in JP-A-2001-82923, for example. However, this method is for increasing the detection quiescent period when no object is detected to thereby achieve low power consumption, and therefore, it is difficult to perform efficient position detection corresponding to the position of the object.

SUMMARY

An advantage of some aspects of the invention is to provide an optical position detection device, an electronic apparatus, a display device, and so on capable of performing position detection efficiently in accordance with the position of the object.

An aspect of the invention relates to an optical position detection device including a light emitting section adapted to emit an irradiation light beam to a detection area set along an X-Y plane, a light receiving section adapted to receive a reflected light beam caused by an object reflecting the irradiation light beam in the detection area, and a detection section adapted to detect position information of the object based on a light reception result of the light receiving section, wherein detection accuracy of the position information of the object varies in accordance with a Z-coordinate position of the object on a Z-axis perpendicular to the X-Y plane.

According to this aspect of the invention, since the detection accuracy of the position information can be varied in accordance with the Z-coordinate position of the object, it is possible to, for example, degrade the detection accuracy in the case in which, for example, the object exists in the detection area where high detection accuracy is not required. As a result, it becomes possible to realize the optical position detection device capable of performing the efficient position detection corresponding to the Z-coordinate position of the object.

Further, according to the aspect of the invention, it is also possible that the detection section varies the coordinate detection period of the object in accordance with the Z-coordinate position of the object.

According to this configuration, by setting the coordinate detection period short in accordance with the Z-coordinate position of the object, it becomes possible to improve the detection accuracy of the position information or to raise the response speed. Further, by setting the coordinate detection period long in accordance with the Z-coordinate position of the object, it becomes possible to degrade the detection accuracy of the position information or to lower the response speed. As a result, since it becomes possible to, for example, set the detection accuracy and the response speed in accordance with the Z-coordinate position of the object, the position detection with preferable detection efficiency, for example, becomes possible. Further, since the power consumption can be reduced by setting the coordinate detection period longer, the position detection with preferable power efficiency, for example, becomes possible.

Further, according to the aspect of the invention, it is also possible that the shorter the distance of the object from the object plane for setting the detection area is, the shorter the detection section sets the coordinate detection period.

According to this configuration, it becomes possible that the shorter the distance of the object from the object plane for setting the detection area is, the higher detection accuracy or the higher response speed the position information of the object is detected with.

Further, according to the aspect of the invention, it is also possible that the light emitting section varies the intensity of the irradiation light beam in accordance with the Z-coordinate position of the object.

According to this configuration, by varying the intensity of the irradiation light beam in accordance with the Z-coordinate position of the object, it becomes possible to vary the detection accuracy of the position information or to vary the power consumption. As a result, it becomes possible to perform the position detection with preferable detection efficiency and power efficiency in accordance with the Z-coordinate position of the object.

Further, according to the aspect of the invention, it is also possible that the shorter the distance of the object from the object plane for setting the detection area is, the weaker the light emitting section sets the intensity of the irradiation light beam.

According to this configuration, by achieving that the longer the distance of the object from the object plane for setting the detection area is, the weaker the intensity of the irradiation light beam is set, it is possible to degrade the detection accuracy of the position information, or to reduce the power consumption.

Further, according to the aspect of the invention, it is also possible that the light receiving section has first through $n^{th}$ (n is an integer one of equal to and larger than 2) light receiving units, and the first through $n^{th}$ light receiving units are arranged along the Z direction.

According to this configuration, the detection areas corresponding respectively to the first through $n^{th}$ light receiving units can be set along the Z direction.

Further, according to the aspect of the invention, it is also possible that the longer the distance from the object plane for setting the detection areas is, the larger the first through $n^{th}$ detection areas of the first through $n^{th}$ light receiving units are set.

According to this configuration, since the detection accuracy of the position information can be varied in accordance with the distance from the object plane for setting the detection area, the position detection with preferable detection efficiency becomes possible.

Further, according to the aspect of the invention, it is also possible that the detection section includes first through $n^{th}$ amplifier sections adapted to amplify the respective light reception detection signals from the first through $n^{th}$ light receiving units, and the gains of the first through $n^{th}$ amplifier sections are set in accordance with the Z-coordinate position.

According to this configuration, in the case in which, for example, the intensity of the reflected light beam varies in accordance with the Z-coordinate position of the object, the gains corresponding to the intensity of the reflected light beam can be set. As a result, the efficient position detection corresponding to the Z-coordinate position of the object, for example, becomes possible.

Further, according to the aspect of the invention, it is also possible that the first through $n^{th}$ light receiving units each have an incident light restriction section adapted to restrict an incident light beam in the direction intersecting the X-Y plane, and the shorter the distance from the object plane for setting the detection area is, the stronger the degree of the restriction of the incident light beam is set.

According to this configuration, it is possible to achieve that the shorter the distance from the object plane for setting the detection area is, the narrower the detection area is set.

Further, according to the aspect of the invention, it is also possible that the incident light restriction section is a slit, and the shorter the distance from the object plane for setting the detection area is, the narrower the width of the slit is.

According to this configuration, since the shorter the distance from the object plane for setting the detection area is, the stronger the degree of the restriction of the incident light beam is set, the detection area can be set narrow.

Further, according to the aspect of the invention, it is also possible that the light emitting section emits the irradiation light beam having the intensity distribution varying in accordance with the position in the detection area.

According to this configuration, since the intensity of the reflected light beam varies in accordance with the position of the object, it is possible to detect the position information of the object based on the light reception result of the light receiving section.

Another aspect of the invention relates to an optical position detection device including a light emitting section adapted to emit an irradiation light beam to a detection area set along an X-Y plane, a light receiving section adapted to receive a reflected light beam caused by an object reflecting the irradiation light beam in the detection area, and a detection section adapted to detect position information of the object based on a light reception result of the light receiving section, wherein the light receiving section has first through $n^{th}$ (n is an integer one of equal to and larger than 2) light receiving units arranged along the Z direction, and at least two light receiving units out of the first through nth light receiving units are different in the width of the slit disposed on the side of the detection area.

According to this aspect of the invention, it is possible to set the detection areas corresponding respectively to the first through nth light receiving units along the Z direction, and to vary the sizes of at least two detection areas out of the detection areas thus set. As a result, since it becomes possible to set the detection accuracy of the position information in accordance with the Z-coordinate position of the object, the position detection with preferable detection efficiency, for example, becomes possible.

Still another aspect of the invention relates to an optical position detection device including a light emitting section adapted to emit an irradiation light beam to a detection area set along an X-Y plane, a light receiving section adapted to receive a reflected light beam caused by an object reflecting the irradiation light beam in the detection area, and a detection section adapted to detect position information of the object based on a light reception result of the light receiving section, wherein the light emitting section varies the intensity of the irradiation light beam in accordance with the distance from the object plane for setting the detection area.

According to this aspect of the invention, it is possible to vary the detection accuracy of the position information and the power consumption in accordance with the distance from the object plane for setting the detection area. As a result, it becomes possible to perform the position detection with preferable detection efficiency and power efficiency in accordance with the position of the object.

Yet another aspect of the invention relates to an electronic apparatus and a display device each including any one of the optical position detection devices described above.

BRIEF DESCRIPTION OF THE DRAWINGS

The invention will be described with reference to the accompanying drawings, wherein like numbers reference like elements.

FIGS. 1A and 1B are diagrams showing a basic configuration example of an optical position detection device and so on.

FIG. 8 is a diagram showing a specific configuration example of the detection section, the drive circuit, and so on.

DESCRIPTION OF AN EXEMPLARY EMBODIMENT

Hereinafter, a preferred embodiment of the invention will be described in detail. It should be noted that the present embodiment explained below does not unreasonably limit the content of the invention as set forth in the appended claims, and all of the constituents set forth in the present embodiment are not necessarily essential as means of the invention for solving the problems.

1. Basic Configuration of Optical Position Detection Device and so on

Figure 1A:
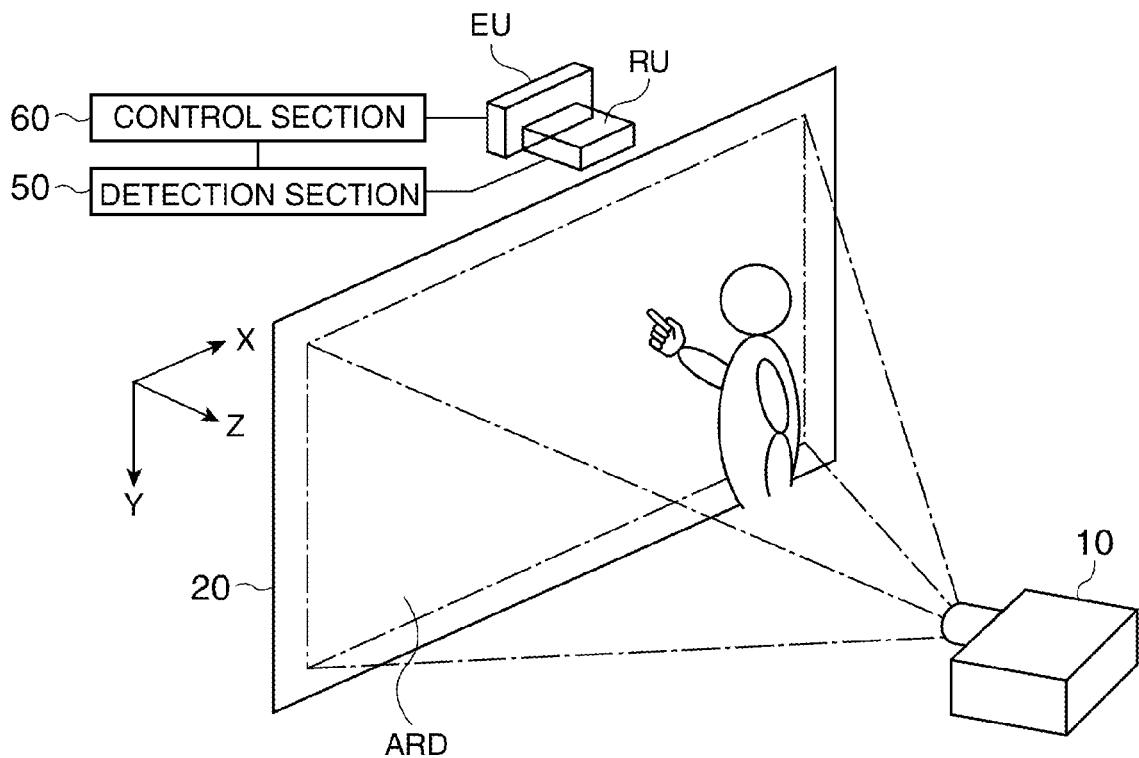
Figure 1B:
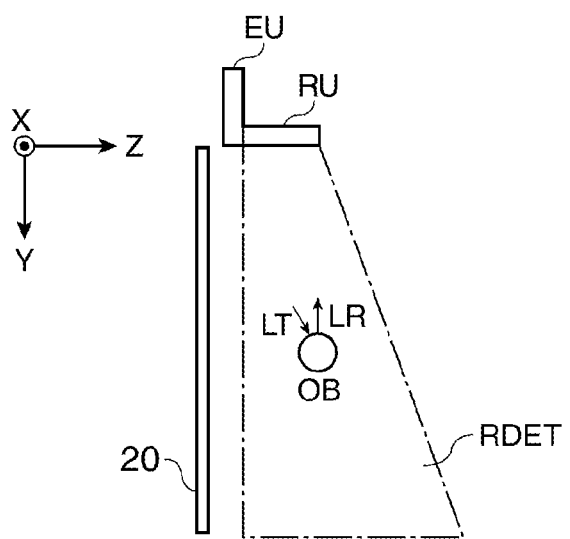

FIGS. 1A and 1B show a basic configuration example of the optical position detection device according to the present embodiment, and an electronic apparatus and a display device using the optical position detection device. FIGS. 1A and 1B show an example of the case of applying the optical position detection device according to the present embodiment to a liquid crystal projector or a projection display device (a projector) called a digital micromirror device. In FIGS. 1A and 1B, the axes intersecting with each other are defined as an X-axis, a Y-axis, and a Z-axis (first, second, and third coordinate axes in a broad sense). Specifically, the X-axis is defined as the lateral direction, the Y-axis is defined as the vertical direction, and the Z-axis is defined as the depth direction.

The optical position detection device according to the present embodiment includes a light emitting section EU, a light receiving section RU, and a detection section 50. Further, a control section 60 can also be included. Further, the display device (the electronic apparatus) according to the present embodiment includes the optical position detection device and a screen 20 (an object plane on which the detection area is set in a broad sense). Further, the display device (the electronic apparatus) can include an image projection device 10 (an image generation device in a broad sense). It should be noted that the optical position detection device, the electronic apparatus, and the display device according to the present embodiment are not limited to the configurations shown in FIGS. 1A and 1B, and can be put into practice in variously modified forms such as elimination of some of the constituents, replacement with other constituents, or addition of other constituents.

The image projection device 10 projects the image display light in an enlarged manner from the projection lens disposed on the front side of the housing toward the screen 20. Specifically, the image projection device 10 generates the display light with a color image, and emits it toward the screen 20 via a projection lens. Thus, it becomes possible to display the color image in the display area ARD of the screen 20.

The optical position detection device according to the present embodiment optically detects the object such as a finger of the user or a stylus pen in the detection area RDET set in front of (on the Z-axis direction side of) the screen as shown in FIG. 1B. In order for achieving this configuration, the light emitting section EU of the optical position detection section emits the irradiation light beam LT for detecting the object to the detection area RDET. Specifically, the light emitting section EU emits the irradiation light beam LT having the intensity distribution varying in accordance with the position in the detection area RDET. It should be noted that the detection area RDET is an area set on the Z-axis direction side (the user side) of the screen 20 (the object plane on which the detection area is set) along the X-Y plane.

The light emitting section EU includes two light source sections LS1, LS2 (not shown) each formed of a light emitting element such as a light emitting diode (LED). The light source sections emit the source light beam such as an infrared light beam (a near infrared light beam near to the visible light range). That is, it is preferable that the source light beam emitted by the light source section LS1 is a light beam in the wavelength band with which the light beam is efficiently reflected by the object such as a finger of the user or a stylus pen, or a light beam in the wavelength band with which the light beam is hardly included in the environment light to be the disturbance light. Specifically, the source light beam is an infrared light beam with the wavelength around 850 nm, which is the light beam in the wavelength band with high reflectance on the surface of a human body, or an infrared light beam with the wavelength around 950 nm, which is the light beam in the wavelength band with which the light beam hardly included in the environment light. It should be noted that the specific configuration of the light emitting section EU will be described later.

The light receiving section RU receives the reflected light beam LR, which is the irradiation light beam LT reflected by the object OB in the detection area RDET. Specifically, the light receiving section RU receives the reflected light beam LR, which is the irradiation light beam LT from the light emitting section EU reflected by the object OB. The light receiving section RU can be realized with the light receiving element such as a photo diode or a photo transistor. The detection section 50 is connected to the light receiving section RU in, for example, an electrical manner.

The detection section 50 detects the position information of the object OB based on the light reception result in the light receiving section RU. The function of the detection section 50 can be realized by an integrated circuit device having an analog circuit and so on or the software (the program) operating on the microcomputer. For example, the detection section 50 converts the detection current generated by the light receiving element of the light receiving section RU receiving the reflected light beam LR from the object OB into a detection voltage, and then detects, for example, the direction in which the object OB is located based on the detection voltage as the light reception result. Specifically, the detection section 50 detects the distance (the distance from the disposition location of the light emitting section EU) to the object OB based on the light reception result (the light reception signal) in the light receiving section RU. Then, the detection section 50 detects the position of the object OB based on the distance thus detected and the direction (the direction in which the object OB is located) of the object OB thus detected. More specifically, the detection section 50 detects the X-Y coordinate thereof in the X-Y plane of the detection area RDET.

It should be noted that it is also possible to arrange that first and second light emitting sections are disposed along the X-axis direction with a predetermined distance. On this occasion, the detection section 50 detects the direction of the object with respect to the first light emitting section as the first direction based on the light reception result of the first reflected light beam caused by the object reflecting the first irradiation light beam from the first light emitting section. Further, the detection section 50 detects the direction of the object with respect to the second light emitting section as the second direction based on the light reception result of the second reflected light beam caused by the object reflecting the second irradiation light beam from the second light emitting section. Then, it is possible to detect the position of the object based on the first and second directions thus detected and the distance between the first and second light emitting sections.

In the optical position detection device according to the present embodiment, the detection accuracy of the position information of the object OB is varied in accordance with the Z-coordinate position of the object OB on the Z-axis perpendicular to the X-Y plane. Specifically, the detection section 50 varies the detection period of the coordinate of the object OB in accordance with the Z-coordinate position of the object OB to thereby vary the detection accuracy of the position information. More specifically, the shorter the distance of the object OB from the object plane (e.g., the screen) 20 on which the detection area is set, the shorter the detection period of the coordinate is set. By adopting the process described above, it becomes possible to achieve that the shorter the distance of the object OB from the object plane 20, namely the closer to the object plane 20 the object OB is located, the higher the position detection accuracy of the object OB is. Conversely, it becomes possible to achieve that the further from the object plane 20 the object OB is located, the lower the position detection accuracy of the object OB is.

For example, in the detection area close to the screen (the object plane) 20, there are performed the operations such as pointing the location of an image or the like displayed on the screen or inputting information to the display device (the electronic apparatus) with handwritten characters. In order for detecting such a rapid movement of a hand or a finger accurately, high position detection accuracy and a high response speed are required in the detection area close to the screen. In contrast, in the detection area distant from the screen, since it is sufficient to detect an approximate position of the object (e.g., a human body), it is possible to lower the position detection accuracy and the response speed.

Further, in the optical position detection device according to the present embodiment, the light emitting section EU varies the intensity of the irradiation light beam LT in accordance with the Z-coordinate position of the object OB to thereby make it possible to vary the detection accuracy of the position information of the object OB. Specifically, it is possible to achieve that the longer the distance of the object OB from the object plane (the screen) 20 is, the lower the intensity of the irradiation light beam LT becomes. By adopting such a configuration, since the intensity of the irradiation light beam can be set lower with respect to the object located far from the object surface (the screen) 20, it becomes possible to degrade the position detection accuracy to thereby reduce the power consumption.

The control section 60 performs various sorts of control processing of the optical position detection device. Specifically, the control section 60 performs, for example, the emission control of the light source sections provided to the light emitting section EU. The control section 60 is electrically connected to the light emitting section EU and the detection section 50. The function of the control section 60 can be realized by an integrated circuit device or the software operating on the microcomputer. For example, the control section 60 performs the control of varying the detection period of the coordinate of the object OB and the control of varying the intensity of the irradiation light beam according to the Z coordinate position of the object OB.

Further, if the light emitting section EU includes the first and second light source sections, the control section 60 performs the control of making the first and second light source sections emit light beams alternately. Further, if the first and second light emitting sections are provided as described above, the control section 60 performs the control of making the first and second light source sections provided to the first light emitting section emit light beams alternately in the first period for obtaining the direction of the object with respect to the first light emitting section. Further, the control section 60 performs the control of making the third and fourth light source sections provided to the second light emitting section emit light beams alternately in the second period for obtaining the direction of the object with respect to the second light emitting section.

As explained hereinabove, according to the optical position detection device of the present embodiment, it is possible to vary the position detection accuracy in accordance with the distance from the screen or the like. Further, since it is possible to vary the coordinate detection period or to vary the intensity of the irradiation light beam in accordance with the distance from the screen or the like, it is possible to degrade the detection accuracy to thereby reduce the power consumption if the high position detection accuracy is not required. As a result, it becomes possible to realize the optical position detection device with low power consumption while keeping the required position detection accuracy.

It should be noted that the optical position detection device according to the present embodiment can be applied not only to the projection display device shown in FIG. 1A but also to various display devices installed in various types of electronic apparatuses. Further, as the electronic apparatuses to which the optical position detection device according to the present embodiment is applied, there can be assumed a variety of apparatuses such as a cellular phone, a personal computer, a car navigation system, a ticket-vending machine, and a banking terminal. The electronic apparatus can include, for example, a display section (a display device) for displaying an image, an input section for inputting information, and a processing section for performing various types of processing based on, for example, the information thus input.

2. Light Receiving Section and Detection Area

Figure 2:
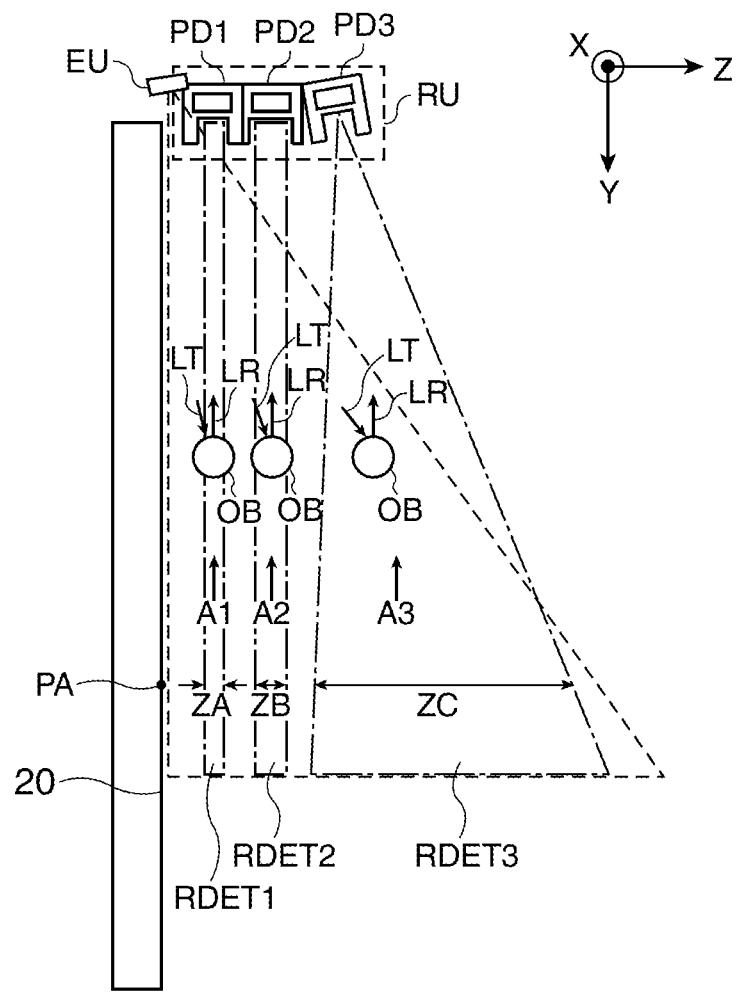
FIG. 2 is a diagram showing a configuration example of a light receiving section and a setting example of the detection area.

FIG. 2 shows a configuration example of the light receiving section RU of the optical position detection device according to the present embodiment and an example of setting the detection area RDET. The light receiving section RU of the optical position detection device according to the present embodiment includes first through $n^{th}$ (n denotes an integer equal to or larger than two) light receiving units PD1 through PDn. It should be noted that the light receiving section RU of the present embodiment is not limited to the configuration shown in FIG. 2, and can be put into practice in variously modified forms such as elimination of some of the constituents, replacement with other constituents, or addition of other constituents. For example, although in the configuration of FIG. 2 the first through third light receiving units PD1 through PD3 are shown, the configuration including four or more light receiving units can also be adopted.

The first through $n^{th}$ light receiving units PD1 through PDn are disposed along the Z direction, and are each realized by a light receiving element such as a photo diode or a photo transistor. Further, first through $n^{th}$ detection areas RDET1 through RDETn are set corresponding respectively to the first through $n^{th}$ light receiving units PD1 through PDn.

Specifically, if, for example, the object OB exists in the first detection area RDET1 as indicated by A1 in FIG. 2, the object OB reflects the irradiation light beam LT from the light emitting section EU, and the first light receiving unit PD1 receives the reflected light beam LR. Further, if the object OB exists in the second detection area RDET2 as indicated by A2 in FIG. 2, the second light receiving unit PD2 receives the reflected light beam LR from the object OB. Further, if the object OB exists in the third detection area RDET3 as indicated by A3 in FIG. 2, the third light receiving unit PD3 receives the reflected light beam LR from the object OB.

It should be noted that the same can also be applied to the configuration provided with four or more light receiving units. Specifically, if the object OB exists in the $i^{th}$ (i denotes an integer satisfying $1 \leq i \leq n$) detection area RDETi, the object OB reflects the irradiation light beam LT from the light emitting section EU, and the $i^{th}$ light receiving unit PDi receives the reflected light beam LR.

The longer the distance from the object plane (e.g., the screen) 20 is, the larger area the first through $n^{th}$ detection areas RDET1 through RDETn of the first through $n^{th}$ light receiving units PD1 through PDn are set to have. Specifically, as shown in, for example, FIG. 2, it is possible to define the extent (the extent in the Z direction) of each of the detection areas along the Z direction from a certain point PA on the object plane (the screen) 20. That is, the first detection area RDET1 is an area having a depth (extent) of ZA in the Z direction, the second detection area RDET2 is an area having a depth (extent) of ZB in the Z direction, and the third detection area RDET3 is an area having a depth (extent) of ZC in the Z direction. The detection areas RDET1 through RDET3 are set so that ZA<ZB<ZC is satisfied if the definition described above is made.

The first through nth light receiving units PD1 through PDn each have an incident light restriction section for restricting the incident light in the direction intersecting the X-Y plane, and it is arranged that the shorter the distance from the object plane (the screen) 20 is, the stronger the degree of restriction of the incident light is set. Specifically, as shown in FIG. 2, the first through third light receiving units PD1 through PD3 have the incident light restriction sections LMT1 through LMT3, and the incident light entering the light receiving unit PD1 is most strongly restricted by the incident light restriction section LMT1, and the incident light entering the light receiving unit PD3 is most weakly restricted by the incident light restriction section LMT3. As a result, the longer the distance from the object plane (e.g., the screen) 20 is, the larger the detection area is set.

Figure 3A:
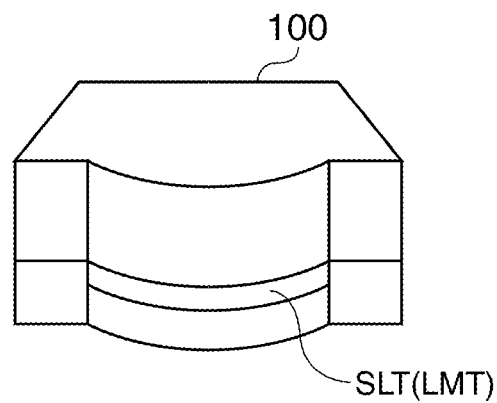
FIGS. 3A and 3B are diagrams showing a configuration example of the light receiving unit having an incident light restriction section.
Figure 3B:
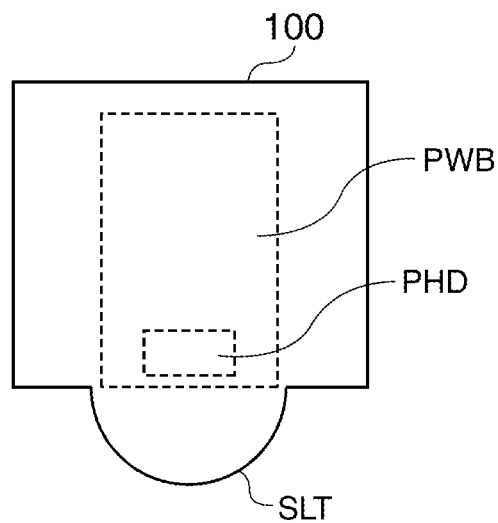

FIGS. 3A and 3B show a configuration example of the light receiving unit having the incident light restriction section LMT. As shown in FIG. 3A, the incident light restriction section LMT is disposed in front of the light receiving element PHD to thereby restrict the incident light entering the light receiving unit. Specifically, the incident light restriction section LMT is formed of a slit SLT, and the shorter the distance from the object plane (the screen) 20 is, the narrower the width of the slit SLT is. Specifically, in the case of the light receiving units PD1 through PD3 shown in FIG. 2, for example, assuming that the slit width of the first light receiving unit PD1 is WA, the slit width of the second light receiving unit PD2 is WB, and the slit width of the third light receiving unit PD3 is WC, WA<WB<WC is satisfied. By adopting such a configuration, it is possible to achieve that the longer the distance from the object plane (the screen) 20 is, the wider the range of the angle in the Z direction of the incident light entering the light receiving unit is. As a result, the longer the distance from the object plane (e.g., the screen) 20 is, the larger the detection area is set.

FIG. 3B is a plan view of the light receiving unit having the slit SLT viewed from the above. For example, a wiring board PWB is disposed inside a housing (case) 100 made of, for example, aluminum, and the light receiving element PHD is mounted on the wiring board PWB.

As explained hereinabove, according to the optical position detection device of the present embodiment, by providing a plurality of light receiving units disposed along the Z direction, and further restricting the incident light entering each of the light receiving units, it is possible to set a plurality of detection areas disposed along the Z direction so as to correspond to the respective light receiving units. Further, it is possible to achieve that the longer the distance from the object plane (e.g., the screen) is, the weaker the degree of restriction of the incident light is set (the broader the detection area is set).

3. Position Detection Operation

Figure 4:
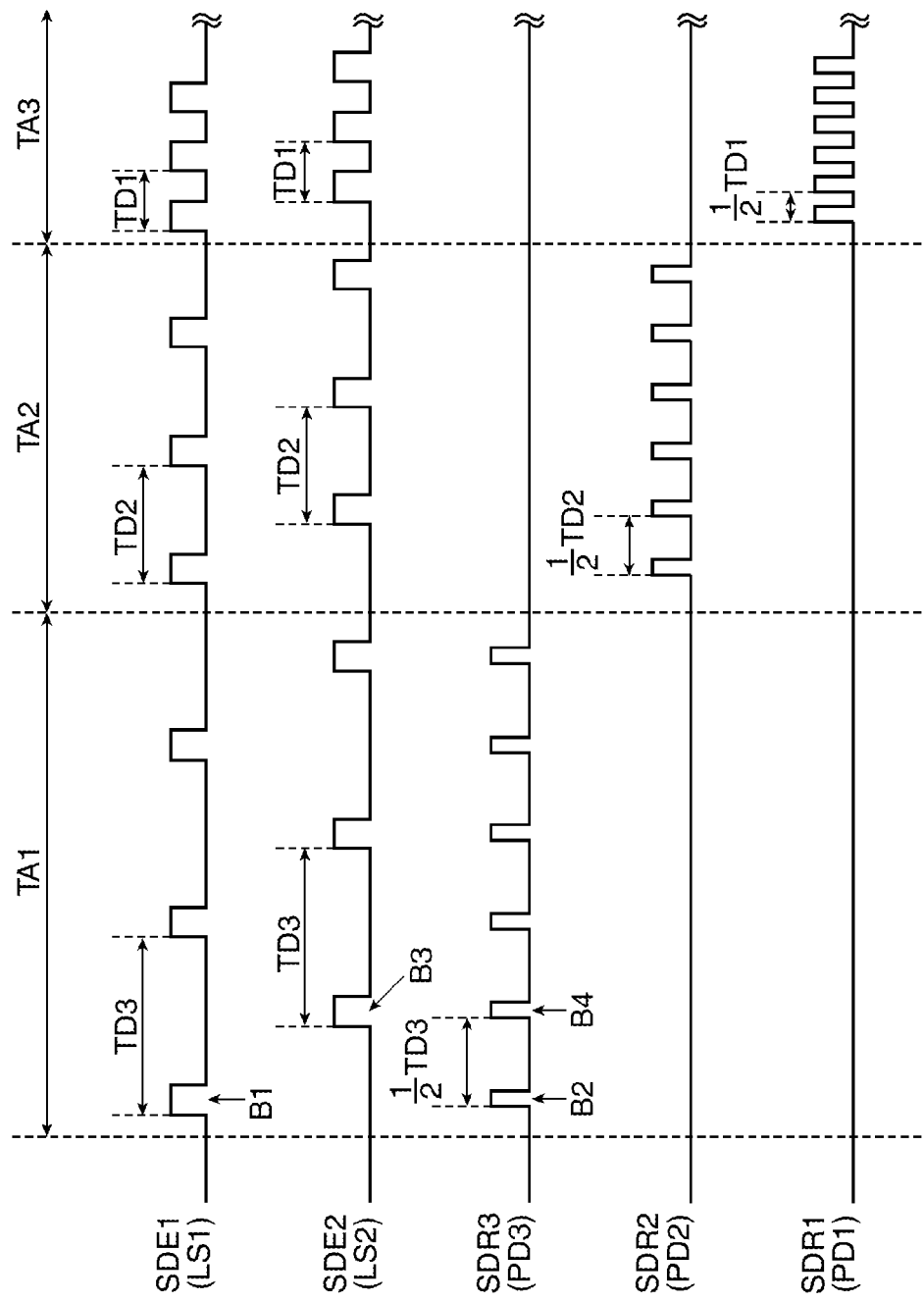
FIG. 4 is a diagram showing an example of the timing chart of the position detection operation.

FIG. 4 is an example of the timing chart of the position detection operation in the configuration example (FIG. 2) of the optical position detection device according to the present embodiment. The timing chart of FIG. 4 shows drive signals SDE1, SDE2 for driving the light source sections (e.g., LEDs) LS1, LS2 of the light emitting section EU, and detection control signals SDR1 through SDR3 for controlling the acquisition of the light reception detection signals from the first through third light receiving units PD1 through PD3. The drive signals SDE1, SDE2 and the detection control signals SDR1 through SDR3 are generated by the control section 60.

According to the optical position detection device of the present embodiment, the detection period of the coordinate of the object can be varied in accordance with the Z-coordinate position of the object. Specifically, the shorter the distance of the object from the object plane (e.g., the screen) 20, the shorter the detection period of the coordinate can be set.

In the first period TA1 shown in FIG. 4, for example, the object existing in the third detection area RDET3 is detected (in the case of A3 shown in FIG. 2). In this case, the light source sections LS1, LS2 are both driven (lit) alternately at the coordinate detection period TD3, the third light receiving unit PD3 receives the reflected light beam from the object OB, and the detection section 50 acquires the light reception detection signal at the period a half as long as the coordinate detection period TD3. Specifically, the light source section LS1 is driven (lit) by the drive signal indicated by B1 in FIG. 4, for example, the irradiation light beam from the light source section LS1 is reflected by the object OB, the reflected light beam is received by the third light receiving unit PD3, and then the light reception detection signal is acquired by the detection control signal indicated by B2 in FIG. 4. Subsequently, the light source section LS2 is driven (lit) by the drive signal indicated by B3 in FIG. 4, the irradiation light beam from the light source section LS2 is reflected by the object OB, the reflected light beam is received by the third light receiving unit PD3, and then the light reception detection signal is acquired by the detection control signal indicated by B4 in FIG. 4. In such a manner as described above, the light source sections LS1, LS2 are lit alternately, and the light reception detection signals are acquired alternately in accordance therewith. It should be noted that the method of obtaining the position information of the object based on the light reception detection signals will be described later.

In the second period TA2, the object existing in the second detection area RDET2 is detected (in the case of A2 shown in FIG. 2). In this case, the light source sections LS1, LS2 are both driven (lit) alternately at the coordinate detection period TD2 (TD2<TD3), the second light receiving unit PD2 receives the reflected light beam from the object OB, and the detection section 50 acquires the light reception detection signals alternately at the period a half as long as the coordinate detection period TD2. Further, in the third period TA3, the object existing in the first detection area RDET1 is detected (in the case of A1 shown in FIG. 2). In this case, the light source sections LS1, LS2 are both driven (lit) alternately at the coordinate detection period TD1 (TD1<TD2), the first light receiving unit PD1 receives the reflected light beam from the object OB, and the detection section 50 acquires the light reception detection signals alternately at the period a half as long as the coordinate detection period TD1.

Although in FIG. 4 the first period TA1 is followed by the second and third periods TA2, TA3, this arrangement is shown only for the sake of convenience of showing the position detection operations in the respective periods in comparison with each other, and there is no need for executing the first period TA1, the second period TA2, and the third period TA3 sequentially in this order. As described later, the detection process to be executed is different depending on which one of the first through third detection areas RDET1 through RDET3 the object exists (is detected) in. For example, if the object is not detected in the first period TA1, it is also possible to repeat the process of the first period TA1 without proceeding to the processes of the second and third period TA2, TA3.

Figure 5:
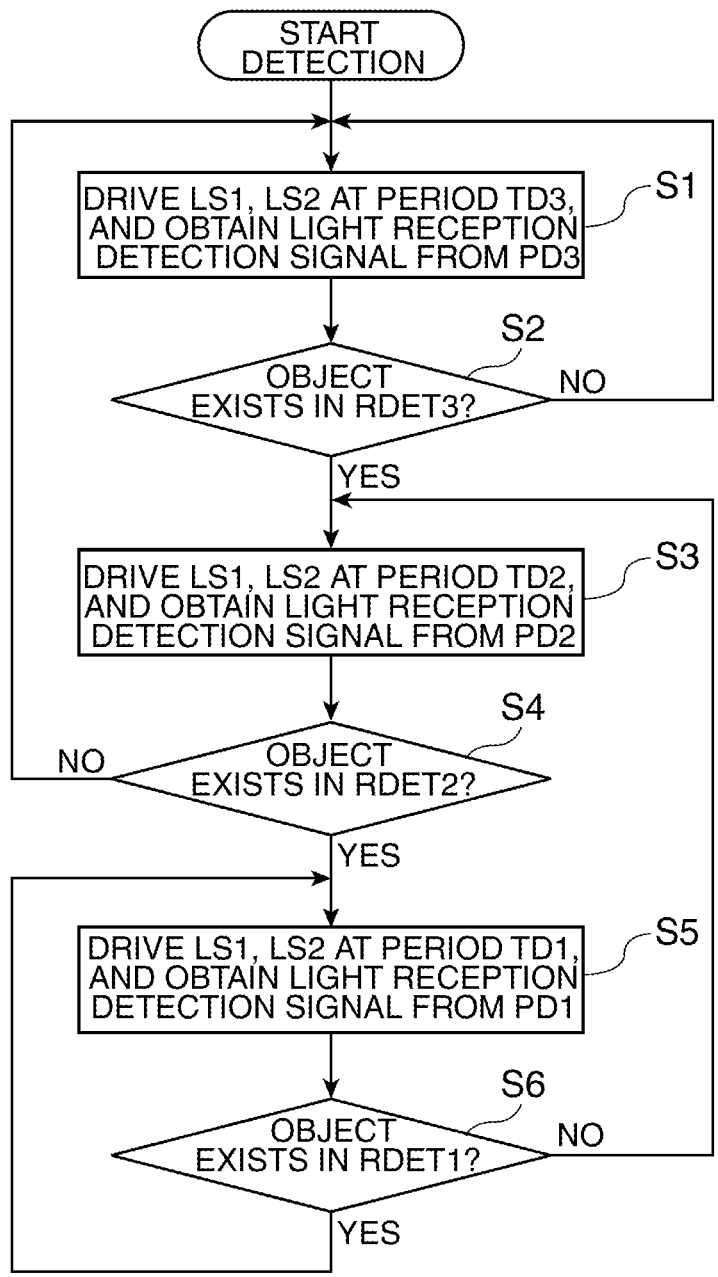
FIG. 5 is a diagram showing an example of the flow of the position detection control.

FIG. 5 shows an example of the flow of the position detection control by the control section 60. The flow (steps S1 through S6) shown in FIG. 5 corresponds to the position detection operation shown in FIG. 4 described above. For example, the step S1 corresponds to the operation in the first period TA1 in FIG. 4, the step S3 corresponds to the operation in the second period TA2, and the step S5 corresponds to the operation in the third period TA3.

Firstly, the light source sections LS1, LS2 are driven at the coordinate detection period TD3, and the light reception detection signal is obtained (step S1) from the third light receiving unit PD3. Then, whether or not the object exists in the third detection area RDET3 is determined (step S2) based on the detection result. If the object exists there, the process proceeds to the step S3. In contrast, if the object does not exist, the process of the step S1 is repeated.

In the step S3, the light source sections LS1, LS2 are driven at the coordinate detection period TD2, and then the light reception detection signal is obtained from the second light receiving unit PD2. Then, whether or not the object exists in the second detection area RDET2 is determined (step S4) based on the detection result. If the object exists there, the process proceeds to the step S5. In contrast, if the object does not exist there, the process returns to the step S1.

In the step S5, the light source sections LS1, LS2 are driven at the coordinate detection period TD1, and then the light reception detection signal is obtained from the first light receiving unit PD1. Then, whether or not the object exists in the first detection area RDET1 is determined (step S6) based on the detection result. If the object exists there, the process of the step S5 is repeated. In contrast, if the object does not exist there, the process returns to the step S3.

As described above, if the object exists in the detection area distant from the screen or the like, the coordinate detection period is set longer to thereby make it possible to degrade the position detection accuracy and to lower the response speed. To the contrary, if the object exists in the detection area near to the screen or the like, the coordinate detection period is set shorter to thereby make it possible to improve the position detection accuracy and to raise the response speed. Further, since the power consumption can be reduced by elongating the coordinate detection period, it becomes possible to, for example, perform power-efficient position detection while keeping the required position detection accuracy according to the distance of the object from the screen and so on.

Figure 6:
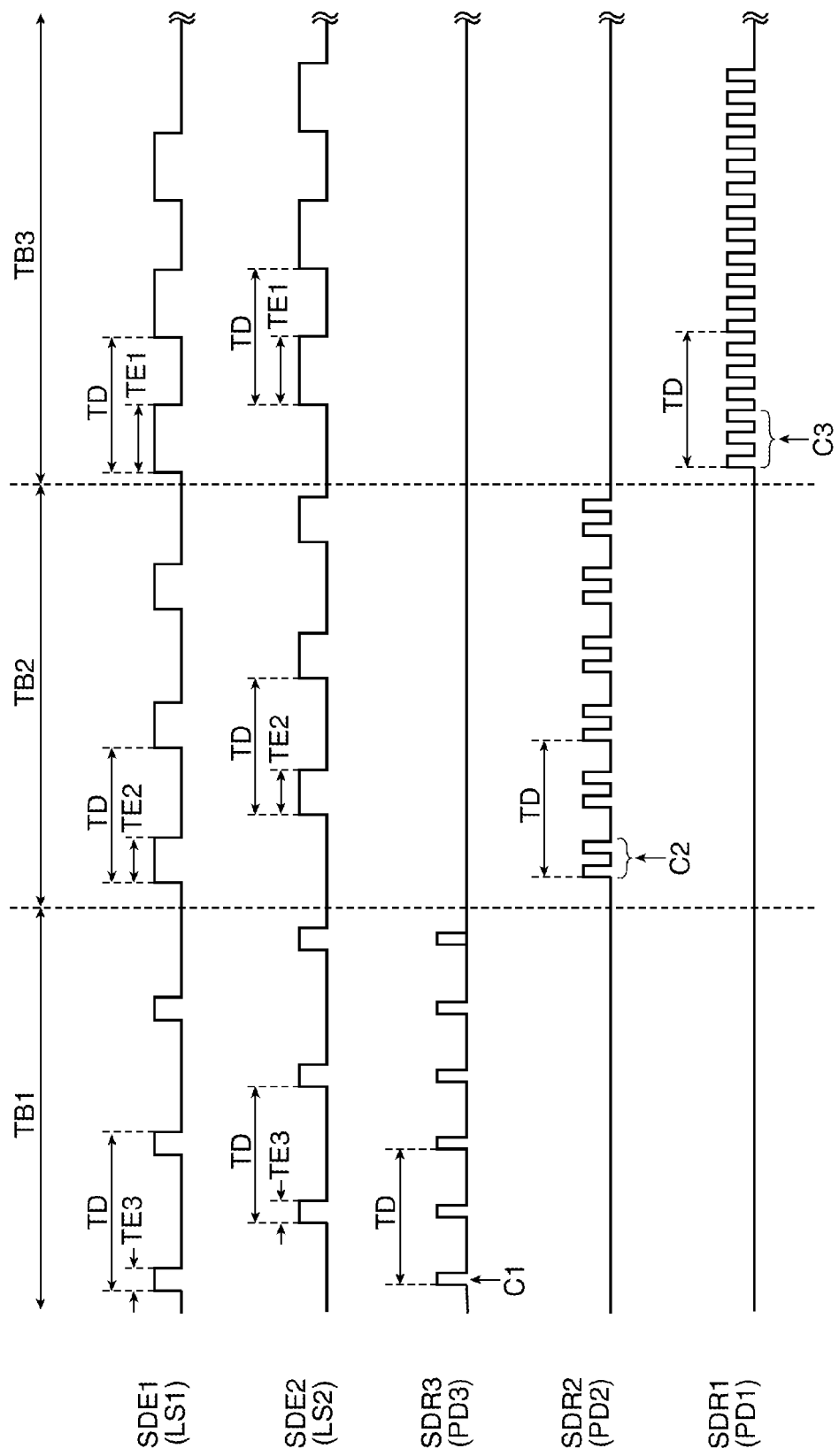
FIG. 6 is a diagram showing another example of the timing chart of the position detection operation.

FIG. 6 is another example of the timing chart of the position detection operation in the configuration example (FIG. 2) of the optical position detection device according to the present embodiment. Similarly to FIG. 4, the timing chart of FIG. 6 shows the drive signals SDE1, SDE2 for driving the light source sections LS1, LS2, and the detection control signals SDR1 through SDR3 for controlling the acquisition of the light reception detection signals from the first through third light receiving units PD1 through PD3.

In the position detection operation shown in FIG. 6, the lighting period TE (TE1 through TE3) of the light source sections LS1, LS2 is varied without varying the coordinate detection period TD. For example, the lighting period is TE3 in the first period TB1 of FIG. 6, the lighting period is TE2 in the second period TB2, and the lighting period is TE1 in the third period TB3.

Specifically, in the first period TB1, the light source sections LS1, LS2 are driven (lit) alternately for the lighting period TE3, the third light receiving unit PD3 receives the reflected light beam reflected by the object, and the light reception detection signal is acquired in accordance with the detection control signal SDR3. Further, in the second period TB2, the light source sections LS1, LS2 are driven (lit) alternately for the lighting period TE2 (TE2>TE3), the second light receiving unit PD2 receives the reflected light beam reflected by the object, and the light reception detection signal is acquired in accordance with the detection control signal SDR2. Further, in the third period TB3, the light source sections LS1, LS2 are driven (lit) alternately for the lighting period TE1 (TE1>TE2), the first light receiving unit PD1 receives the reflected light beam reflected by the object, and the light reception detection signal is acquired in accordance with the detection control signal SDR1.

In the position detection operation shown in FIG. 6, the number of times of acquisition of the light reception detection signal in one lighting period can be varied in accordance with the length of each the lighting periods TE1 through TE3. For example, as indicated by C1 in FIG. 6, in the first period TB1, the number of times of acquisition of the light reception signal in one lighting period is one. As indicated by C2 in FIG. 6, the number of times of acquisition of the light reception detection signal can be set to two in the second period TB2, and further, as indicated by C3 in FIG. 6, the number of times of acquisition of the light reception detection signal can be set to three in the third period TB3. Since the number of times of acquisition of the light reception detection signal can be increased by thus elongating the lighting period of the light source section, it becomes possible to improve the position detection accuracy. Further, to the contrary, the position detection accuracy is degraded by shortening the lighting period of the light source section, which makes it possible to reduce the power consumption.

Figure 7:
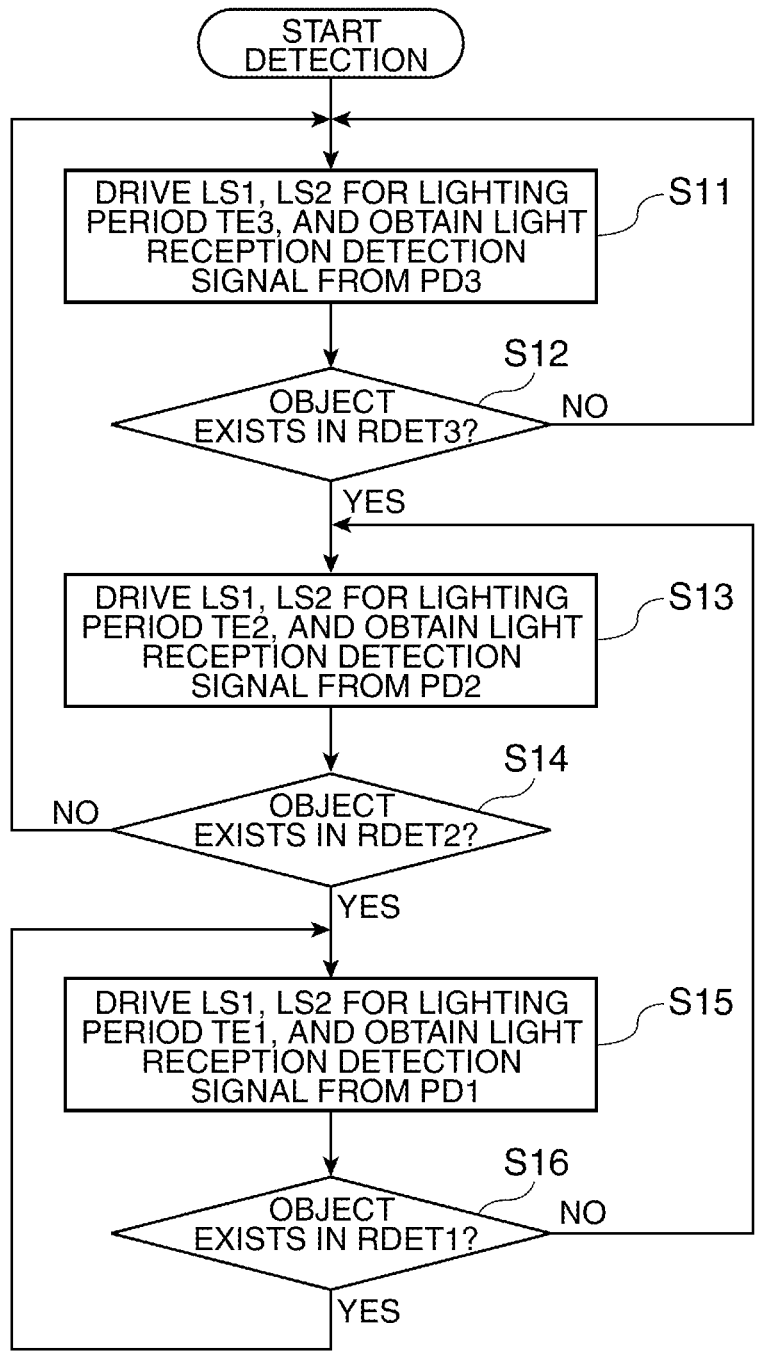
FIG. 7 is a diagram showing another example of the flow of the position detection control.

FIG. 7 shows another example of the flow of the position detection control by the control section 60. The flow (steps S11 through S16) shown in FIG. 7 corresponds to the position detection operation shown in FIG. 6 described above. For example, the step S11 corresponds to the operation in the first period TB1 in FIG. 6, the step S13 corresponds to the operation in the second period TB2, and the step S15 corresponds to the operation in the third period TB3.

Firstly, the light source sections LS1, LS2 are driven for the lighting period TE3, and the light reception detection signal is obtained (step S11) from the third light receiving unit PD3. Then, whether or not the object exists in the third detection area RDET3 is determined (step S12) based on the detection result. If the object exists there, the process proceeds to the step S13. In contrast, if the object does not exist there, the process of the step S11 is repeated.

In the step S13, the light source sections LS1, LS2 are driven for the lighting period TE2, and then the light reception detection signal is obtained from the second light receiving unit PD2. Then, whether or not the object exists in the second detection area RDET2 is determined (step S14) based on the detection result. If the object exists there, the process proceeds to the step S15. In contrast, if the object does not exist there, the process returns to the step S11.

In the step S15, the light source sections LS1, LS2 are driven for the lighting period TE1, and then the light reception detection signal is obtained from the first light receiving unit PD1. Then, whether or not the object exists in the first detection area RDET1 is determined (step S16) based on the detection result. If the object exists there, the process of the step S15 is repeated. In contrast, if the object does not exist there, the process returns to the step S13.

In the case in which the object exists in the detection area near to the screen or the like as described above, since the number of times of acquisition of the light reception detection signal can be increased by elongating the lighting period of the light source section, it becomes possible to improve the position detection accuracy. Further, to the contrary, in the case in which the object exists in the detection area distant from the screen or the like, the position detection accuracy is degraded by shortening the lighting period of the light source section, which makes it possible to reduce the power consumption. As a result, it becomes possible to, for example, perform the position detection efficiently in accordance with the distance of the object from the screen or the like.

4. Detection Section

Figure 8:
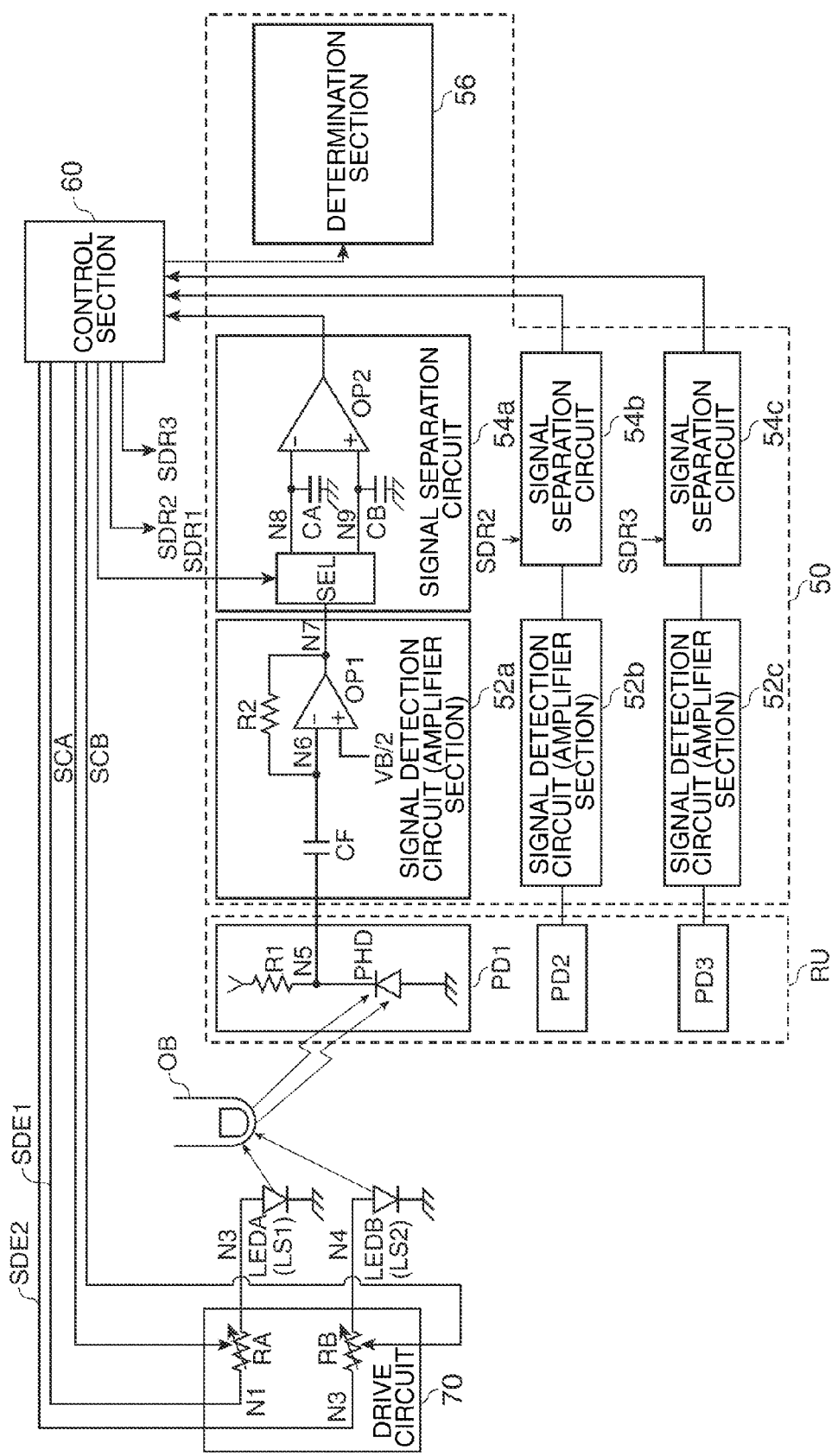

FIG. 8 shows a specific configuration example of the detection section 50, the drive circuit 70, and so on according to the present embodiment. The detection section 50 includes signal detection circuits 52a through 52c (first through $n^{th}$ amplifier sections in a broad sense), signal separation circuits 54a through 54c, and a determination section 56. The light receiving section RU includes the light receiving units PD1 through PD3 (first through $n^{th}$ light receiving units in a broad sense). The light receiving units PD1 through PD3 are disposed along the Z direction as shown in, for example, FIG. 2. It should be noted that the detection section 50, the drive circuit 70, and so on of the present embodiment are not limited to the configuration shown in FIG. 8, and can be put into practice in variously modified forms such as elimination of some of the constituents, replacement with other constituents, or addition of other constituents.

The drive circuit 70 drives a light emitting element LEDA of the light source section LS1 and a light emitting element LEDB of the light source section LS2. The drive circuit 70 includes a variable resistors RA, RB. The drive signal SDE1 having a rectangular waveform is input to one end of the variable resistor RA from the control section 60. The variable resistor RA is disposed between the input node N1 of the drive signal SDE1 and the node N2 on the anode side of the light emitting element LEDA. The variable resistor RB is disposed between the input node N3 of the drive signal SDE2 and the node N4 on the anode side of the light emitting element LEDB. The light emitting element LEDA is disposed between the node N2 and GND (VSS), and the light emitting element LEDB is disposed between the node N4 and GND.

Further, in the period in which the drive signal SDE1 is in the H level, the current flows through the light emitting element LEDA via the variable resistor RA to thereby make the light emitting element LEDA emit the light beam. Further, in the period in which the drive signal SDE2 is in the H level, the current flows through the light emitting element LEDB via the variable resistor RB to thereby make the light emitting element LEDB emit the light beam. As described above, it is possible to make the light source section LS1 and the light source section LS2 emit the light beams alternately with the waveforms of the drive signals SDE1, SDE2 shown in FIGS. 4 and 6.

As describe above, in the optical position detection device according to the present embodiment, the light receiving unit (the light receiving unit for detecting the reflected light beam) to which the reflected light beam is input is different depending on which one of the detection areas RDET1 through RDET3 the object OB exists in. As explained with reference to FIG. 2, for example, the first light receiving unit PD1 detects the reflected light beam if the object OB exists in the detection area RDET1, the second light receiving unit PD2 detects the reflected light beam if the object OB exists in the detection area RDET2, and the third light receiving unit PD3 detects the reflected light beam if the object OB exists in the detection area RDET3.

The light receiving unit PD1 includes the light receiving element PHD realized by, for example, a photo diode, and a resistor R1 for current-voltage conversion. Further, in the period (the first light emitting period) in which the light source section LS1 emits the light beam, the reflected light beam from the object OB due to the light beam from the light emitting element LEDA enters, for example, the light receiving element PHD of the light receiving unit PD1 to make the current flow through the resistor R1 and the light receiving element PHD, and thus the voltage signal is generated at a node N5. On the other hand, in the period (the second light emitting period) in which the light source section LS2 emits the light beam, the reflected light beam from the object OB due to the light beam from the light emitting element LEDB enters, for example, the light receiving element PHD of the light receiving unit PD1 to make the current flow through the resistor R1 and the light receiving element PHD, and thus the voltage signal is generated at the node N5. It should be noted that it is possible for the other light receiving units PD2, PD3 to have the same configurations.

The signal detection circuit (the amplifier section) 52a includes a capacitor CF, an operational amplifier OP1, and a resistor R2, and amplifies the light reception detection signal from the first light receiving unit PD1. The capacitor CF functions as a high-pass filter for cutting the DC component (the direct-current component) of the voltage signal of the node N5. By providing such a capacitor CF, it is possible to cut the low frequency component and the direct-current component due to the environment light to thereby improve the detection accuracy. A DC bias setting circuit composed of the operational amplifier OP1 and the resistor R2 is a circuit for setting the DC bias voltage (VB/2) to the AC signal in which the DC component has been cut. It should be noted that the other signal detection circuits (the amplifier sections) 52b, 52c can be provided with substantially the same configurations, and amplify the light reception detection signals from the respective light receiving units PD2, PD3.

The signal separation circuit 54a includes a selection circuit SEL, capacitors CA, CB, and an operational amplifier OP2. The selection circuit SEL selects either one of the two input nodes of the operational amplifier OP2 and then inputs the output from the signal detection circuit 52a to the input node thus selected. Specifically, in the first light emitting period, the selection circuit SEL connects the output node N7 of the signal detection circuit 52a to the node N8 of the inverting input (−) of the operational amplifier OP2. On the other hand, in the second light emitting period, the selection circuit SEL connects the output node N7 of the signal detection circuit 52a to the node N9 of the non-inverting input (+) of the operational amplifier OP2. The operational amplifier OP2 compares a voltage signal of the node N8 held by the capacitor CA and a voltage signal of the node N9 held by the capacitor CB with each other. It should be noted that the other signal separation circuits 54b, 54c can have substantially the same configurations, and are controlled based on the detection control signals SDR2, SDR3, respectively.

Further, the control section 60 controls the resistance values of the variable resistors RA, RB of the drive circuit 70 using the control signals SCA, SCB based on the comparison result of the voltage signals of the nodes N8, N9 in the signal separation circuits 54a through 54c. The determination section 56 performs the determination process of the position of the object based on the control result of the resistance values of the variable resistors RA, RB in the control section 60.

In the optical position detection device according to the present embodiment, assuming that the detected light reception amount of the light receiving element PHD in the first light emitting period is Ga and the detected light reception amount of the light receiving element PHD in the second light emitting period is Gb, the control section 60 controls the resistance values of the variable resistors RA, RB based on the comparison results in the signal separation circuits 54a though 54c so that the ratio Ga/Gb of the detected light reception amounts becomes 1. In other words, the control section 60 performs the emission control of the light source sections LS1, LS2 so that the ratio Ga/Gb of the detected light reception amounts becomes 1. By performing the control for achieving Ga/Gb=1 described above, the determination process of the position of the object is performed. It should be noted that details of the position detection method will be described later.

Further, according to the optical position detection device of the present embodiment, the light emitting section EU can vary the intensity of the irradiation light beam in accordance with the Z-coordinate position of the object OB. Specifically, it is possible for the light emitting section EU to achieve that the longer the distance of the object OB from the object plane (e.g., the screen) is, the lower the intensity of the irradiation light beam becomes. More specifically, if, for example, the object OB exists (is detected) in the detection area RDET3 far from the object plane (e.g., the screen), the control section 60 controls the resistance values of the variable resistors RA, RB with the control signals SCA, SCB to reduce the emission intensities of both of the light source sections LS1, LS2 to thereby weaken the intensities of the irradiation light beams. By performing the control described above, it becomes possible to degrade the position detection accuracy and at the same time reduce the power consumption with respect to the object located far from the screen or the like.

Further, in the optical position detection device according to the present embodiment, the gains of the first through nth amplifier sections are set in accordance with the Z-coordinate positions. Specifically, assuming that, for example, the gain of the first amplifier section (the signal detection circuit) 52a for amplifying the light reception detection signal from the light receiving unit PD1 is G1, the gain of the second amplifier section (the signal detection circuit) 52b for amplifying the light reception detection signal from the light receiving unit PD2 is G2, and the gain of the third amplifier section (the signal detection circuit) 52c for amplifying the light reception detection signal from the light receiving unit PD3 is G3, the gains are set so that G1<G2<G3 is satisfied. By setting the gains as described above, it is possible to appropriately detect the reflected light beam with a weak intensity from the object distant from the screen or the like. As a result, the efficient position detection corresponding to the position of the object, for example, becomes possible.

5. Light Emitting Section

Figure 9:
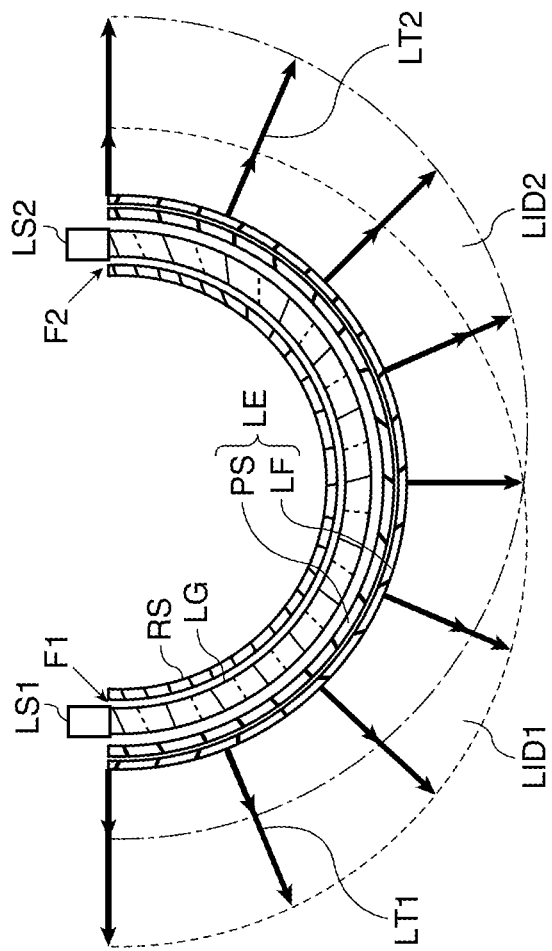
FIG. 9 is a diagram showing a detailed configuration example of a light emitting section.

FIG. 9 shows a detailed configuration example of the light emitting section EU included in the optical position detection device according to the present embodiment. The light emitting section EU of the configuration example shown in FIG. 9 includes the light source sections LS1, LS2, a light guide LG, and an irradiation direction setting section LE. Further, a reflecting sheet RS is also included. Further, the irradiation direction setting section LE includes an optical sheet PS and a louver film LF. It should be noted that the light emitting section EU of the present embodiment is not limited to the configuration shown in FIG. 9, and can be put into practice in variously modified forms such as elimination of some of the constituents, replacement with other constituents, or addition of other constituents.

The light source sections LS1, LS2 are for emitting the source light beams, and each provided with a light emitting element such as a light emitting diode (LED). The light source sections LS1, LS2 each emit the source light beam, for example, of an infrared light beam (a near infrared light beam near to the visible light range). That is, it is desirable that the source light beam emitted by each of the light source sections LS1, LS2 is a light beam in the wavelength band with which the light beam is efficiently reflected by the object such as a finger of the user or a stylus pen, or a light beam in the wavelength band with which the light beam is hardly included in the environment light to be the disturbance light. Specifically, the source light beam is an infrared light beam with the wavelength around 850 nm, which is the light beam in the wavelength band with high reflectance on the surface of a human body, or an infrared light beam with the wavelength around 950 nm, which is the light beam in the wavelength band with which the light beam hardly included in the environment light.

The light source section LS1 is disposed on one end of the light guide LG as indicated by the symbol F1 in FIG. 9. Further, the second light source section LS2 is disposed on the other end of the light guide LG as indicated by the symbol F2. Further, the light source section LS1 emits the source light beam toward the light entrance surface of the one end (F1) of the light guide LG to thereby emit the irradiation light beam LT1, and form (set) the first irradiation light intensity distribution LID1 in the detection area of the object. Meanwhile, the light source section LS2 emits the second source light beam toward the light entrance surface of the other end (F2) of the light guide LG to thereby emit the second irradiation light beam LT2, and form the second irradiation light intensity distribution LID2 with different intensity distribution from the first irradiation light intensity distribution LID1 in the detection area. As described above, the light emitting section EU is capable of emitting the irradiation light beam having the intensity distribution varying in accordance with the position in the detection area RDET.

The light guide LG (the light guide member) is for guiding the source light beams emitted by the light source sections LS1, LS2. For example, the light guide LG has a curved shape, and guides the source light beams from the light source sections LS1, LS2 along a curved light guide path. Specifically, in FIG. 9, the light guide LG has a circular arc shape. It should be noted that although the light guide LG has the circular arc shape with the central angle of 180 degrees in FIG. 9, it is also possible for the light guide LG to have a circular arc shape with the central angle smaller than 180 degrees. The light guide LG is made of a transparent resin member such as acrylic resin or polycarbonate.

On at least one of the outer circumferential side and the inner circumferential side of the light guide LG, there is performed a process for adjusting the emission efficiency of the source light beam from the light guide LG. As the method of the process, there can be adopted various methods such as a serigraphy method for printing the reflecting dots, a molding method for providing a concavo-convex shape using a stamper or injection, and a groove processing method.

The irradiation direction setting section LE (the irradiation light emitting section) realized with the prism sheet PS and the louver film LF is disposed on the outer circumferential side of the light guide LG, and receives the source light beam emitted from the outer circumferential side (the outer circumferential surface) of the light guide LG. Then, the irradiation direction setting section LE emits the irradiation light beams LT1, LT2 having the irradiation direction set to the direction from the inner circumferential side to the outer circumferential side of the light guide LG having the curved shape (the circular arc shape). In other words, the irradiation direction setting section LE sets (restricts) the direction of the source light beams emitted from the outer circumferential side of the light guide LG to the irradiation direction along, for example, the normal direction (the radial direction) of the light guide LG. Thus, it becomes that the irradiation light beams LT1, LT2 are emitted radially, in the direction from the inner circumferential side toward the outer circumferential side of the light guide LG.

The setting of the irradiation directions of the irradiation light beams LT1, LT2 described above is realized by the prism sheet PS and the louver film LF of the irradiation direction setting section LE. For example, the prism sheet PS raises the direction of the source light beam, which is emitted from the outer circumferential side of the light guide LG with a low viewing angle, toward the normal direction to thereby set the direction so that the peak of the emission characteristics is in the normal direction. Further, the louver film LF blocks (cuts) the light beam (low-viewing angle light beam) with the direction other than the normal direction.

As described above, according to the light emitting section EU of the present embodiment, the light source sections LS1, LS2 are respectively disposed on the both ends of the light guide LG, and are made to light alternately, thereby making it possible to form two irradiation light intensity distributions. In other words, the irradiation light intensity distribution LID1 having the higher intensity on the one end of the light guide LG and the irradiation light intensity distribution LID2 having the higher intensity on the other end of the light guide LG can be formed alternately.

By forming such irradiation light intensity distributions LID1, LID2, and receiving the reflected light beams of the object due to the irradiation light beams with these intensity distributions, it becomes possible to detect the object with higher accuracy while suppressing the influence of the disturbance light such as the environment light to the minimum. In other words, it becomes possible to cancel out the infrared component included in the disturbance light, and therefore, it becomes possible to suppress the harmful influence of the infrared component exerted on the detection of the object to the minimum.

6. Position Detection Method

Figure 10A:
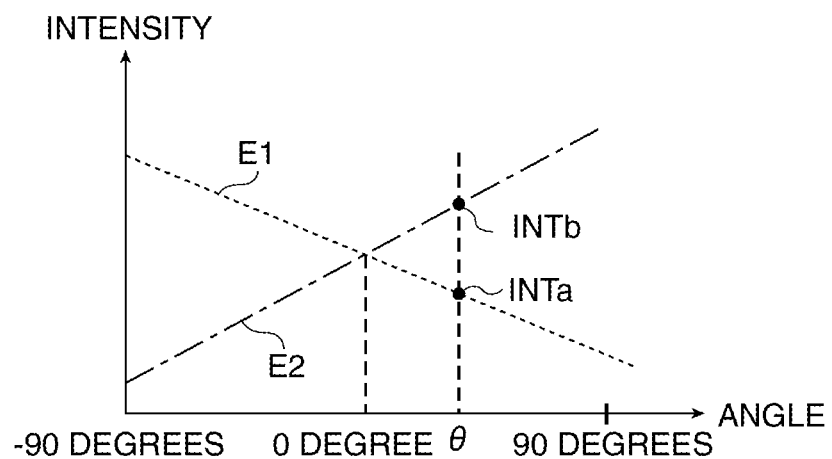
FIGS. 10A and 10B are diagrams for explaining a method of the position detection.
Figure 10B:
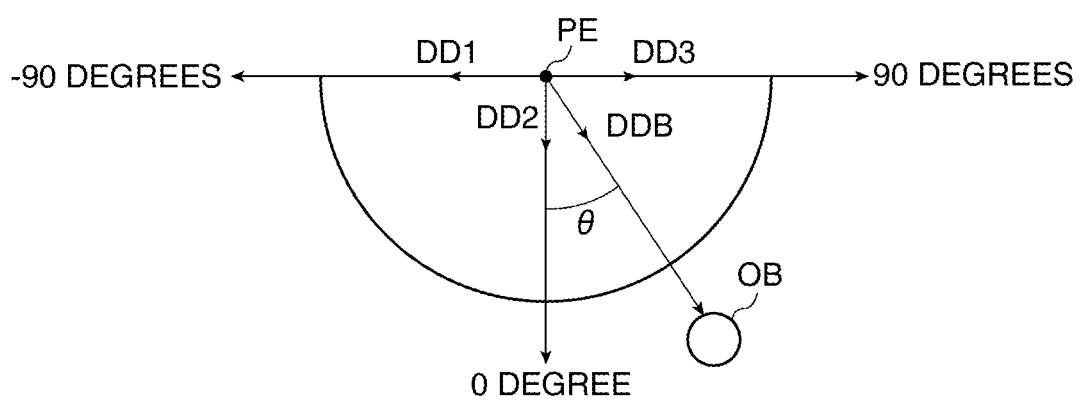

FIGS. 10A and 10B are diagrams for explaining a method of the position detection by the optical position detection device according to the present embodiment.

The line E1 in FIG. 10A represents the relationship between the angle of the irradiation direction of the irradiation light beam LT1 and the intensity of the irradiation light beam LT1 at that angle in the irradiation light intensity distribution LID1 shown in FIG. 9. According to the line E1 in FIG. 10A, the intensity becomes the highest in the case in which the irradiation direction is the direction (leftward) of DD1 in FIG. 10B. In contrast, the intensity becomes the lowest in the case in which the irradiation direction is the direction (rightward) of DD3, and in the case of the direction of DD2, the intensity takes the value intermediate therebetween. Specifically, in accordance with the variation in the angle from the direction DD1 to the direction DD3, the intensity of the irradiation light beam decreases monotonically, namely varies linearly, for example. It should be noted that in FIG. 10B the center position of the circular arc shape of the light guide LG corresponds to the arrangement position PE of the light emitting section EU.

Further, the line E2 in FIG. 10A represents the relationship between the angle of the irradiation direction of the irradiation light beam LT2 and the intensity of the irradiation light beam LT2 at that angle in the irradiation light intensity distribution LID2 shown in FIG. 9. According to the line E2 in FIG. 10A, the intensity becomes the highest in the case in which the irradiation direction is the direction of DD3 in FIG. 10B. In contrast, the intensity becomes the lowest in the case in which the irradiation direction is the direction of DD1, and in the case of the direction of DD2, the intensity takes the value intermediate therebetween. Specifically, in accordance with the variation in the angle from the direction DD3 to the direction DD1, the intensity of the irradiation light beam decreases monotonically, namely varies linearly, for example. It should be noted that although in FIG. 10A the relationship between the angle of the irradiation direction and the intensity is assumed to be a linear relationship, the present embodiment is not limited to this configuration, but a hyperbolic relationship, for example, can also be adopted.

Further, it is assumed that the object OB exists in the direction DDB at an angle θ as shown in FIG. 10B. Then, in the case (the case of E1) in which the light source section LS1 emits the light beam to thereby form the irradiation light intensity distribution LID1, the intensity at the position of the object OB existing in the direction of DDB (angle θ) becomes INTa as shown in FIG. 10A. On the other hand, in the case (the case of E2) in which the light source section LS2 emits the light beam to thereby form the irradiation light intensity distribution LID2, the intensity at the position of the object OB existing in the direction of DDB becomes INTb.

Figure 11:
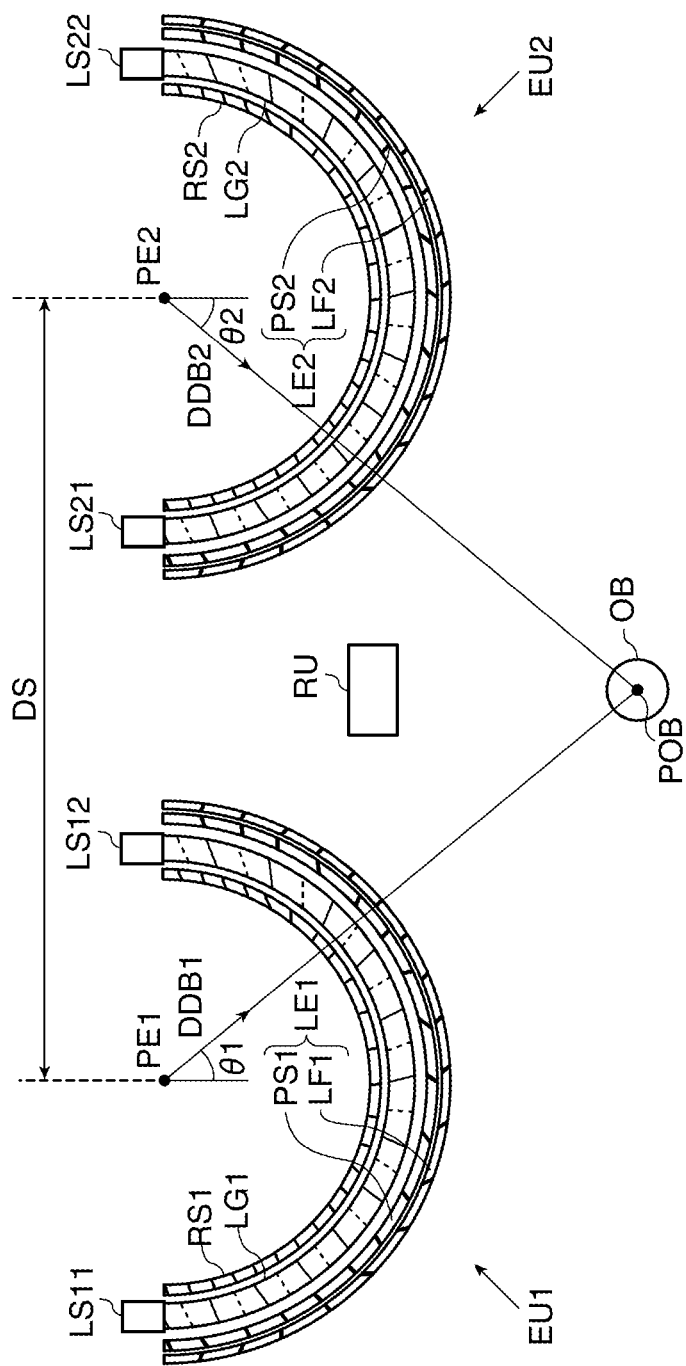
FIG. 11 is a diagram showing a modified example of the light emitting section.

Therefore, the direction DDB (the angle θ) in which the object OB is located can be identified by obtaining the relationship between these intensity values INTa, INTb. Further, if, for example, two irradiation units EU1, EU2 are provided as the light emitting section EU, and the directions DDB1 (θ1), DDB2 (θ2) of the object OB with respect to the irradiation units EU1, EU2 are obtained as shown in FIG. 11 described later, the position of the object OB can be identified using these directions DDB1, DDB2 and the distance DS between the irradiation units EU1, EU2.

In order for obtaining the relationship between these intensity values INTa, INTb, in the present embodiment the light receiving section RU receives the reflected light beam (a first reflected light beam) of the object OB when forming the irradiation light intensity distribution LID1. Assuming that the detected light reception amount of the reflected light beam in this case is Ga, the value Ga becomes to correspond to the intensity INTa. Further, the light receiving section RU receives the reflected light beam (a second reflected light beam) of the object OB when forming the irradiation light intensity distribution LID2. Assuming that the detected light reception amount of the reflected light beam in this case is Gb, the value Gb becomes to correspond to the intensity INTb. Therefore, if the relationship between the detected light reception amounts Ga, Gb is obtained, the relationship between the intensity values INTa, INTb is obtained, and thus the direction DDB in which the object OB is located can be obtained.

For example, the control amount (e.g., the current amount), the conversion coefficient, and the emission amount of the light source section LS1 are denoted as Ia, k, and Ea, respectively. Further, the control amount (e.g., the current amount), the conversion coefficient, and the emission amount of the light source section LS2 are denoted as Ib, k, and Eb, respectively. Then, the formulas (1), (2) below are obtained.

$$Ea = k \cdot Ia \quad (1)$$

$$Eb = k \cdot Ib \quad (2)$$

Further, the damping factor of the source light beam (the first source light beam) from the light source section LS1 is denoted as fa, and the detected light reception amount of the reflected light beam (the first reflected light beam) corresponding to the source light beam is denoted as Ga. Further, the damping factor of the source light beam (the second source light beam) from the light source section LS2 is denoted as fb, and the detected light reception amount of the reflected light beam (the second reflected light beam) corresponding to the source light beam is denoted as Gb. Then, the formulas (3), (4) below are obtained.

$$Ga = fa \cdot Ea = fa \cdot k \cdot Ia \quad (3)$$

$$Gb = fb \cdot Eb = fb \cdot k \cdot Ib \quad (4)$$

Therefore, the ratio between the detected light reception amounts Ga, Gb can be expressed as the formula (5) below.

$$Ga/Gb = (fa/fb) \cdot (Ia/Ib) \quad (5)$$

Here, Ga/Gb can be identified from the light reception result in the light receiving section RU, and the Ia/Ib can be identified from the control amount of the light emitting section EU by the control section 60. Further, the intensity values INTa, INTb shown in FIG. 10A and the damping factors fa, fb are in unique relationships, respectively. For example, the case in which the damping factors fa, fb have small values, and the attenuation amounts are large means that the intensity values INTa, INTb are small. In contrast, the case in which the damping factors fa, fb have large values, and the attenuation amounts are small means that the intensity values INTa, INTb are large. Therefore, by obtaining the ratio fa/fb of the damping factors using the formula (5) above, it becomes possible to obtain the direction, the position, and so on of the object.

More specifically, one control amount Ia is fixed to Im, and then the other control amount Ib is controlled so that the ratio Ga/Gb of the detected light reception amounts becomes 1. For example, the control of lighting the light source sections LS1, LS2 alternately with the phases reverse to each other is performed, the waveform of the detected light reception amount is analyzed, and then the other control amount Ib is controlled so that the detected waveform is not observed (so that Ga/Gb=1 is satisfied). Then, the ratio fa/fb of the damping factors is obtained from the other control amount Ib=Im·(fa/fb) on this occasion to thereby obtain the direction, the position, and so on of the object.

Further, it is also possible to perform the control so that Ga/Gb=1 is satisfied, and at the same time, the sum of the control amounts Ia, Ib becomes constant as expressed by the formulas (6), (7) below.

$$Ga/Gb = 1 \quad (6)$$

$$Im = Ia + Ib \quad (7)$$

By substituting the formulas (6), (7) into the formula (5) above, the formula (8) below is obtained.

$$Ga/Gb = 1 = (fa/fb) \cdot (Ia/Ib) = (fa/fb) \cdot \{(Im-Ib)/Ib\} \quad (8)$$

According to the formula (8) above, Ib is expressed as the formula (9) below.

$$Ib = \{fa/(fa+fb)\} \cdot Im \quad (9)$$

Here, $\alpha = fa/(fa+fb)$ is defined, the formula (9) above is expressed as the formula (10) below, and the ratio fa/fb of the damping factors is expressed as the formula (11) below using $\alpha$.

$$Ib = \alpha \cdot Im \quad (10)$$

$$fa/fb = \alpha/(1-\alpha) \quad (11)$$

Therefore, if the control is performed so that Ga/Gb=1 is satisfied and the sum of the control amounts Ia, Ib becomes a constant value Im, the ratio fa/fb of the damping factors can be obtained by obtaining $\alpha$ using the formula (10) above based on the control amount Ib and the constant value Im at that moment, and then substituting $\alpha$ thus obtained into the formula (11) above. Thus, it becomes possible to obtain the direction, the position, and so on of the object. Further, by performing the control so that Ga/Gb=1 is satisfied, and at the same time, the sum of the control amounts Ia, Ib becomes the constant value, it becomes possible to cancel out the influence of the disturbance light, and thus the improvement of the detection accuracy can be achieved.

FIG. 11 shows a modified example of the light emitting section EU of the present embodiment. In FIG. 11, as the light emitting section EU, there are provided first and second irradiation units EU1, EU2. These first and second irradiation units EU1, EU2 are disposed with a predetermined distance DS in the direction along the surface of the detection area RDET for the object OB. In other words, the first and second irradiation units EU1, EU2 are disposed with the distance DS along the X-axis direction shown in FIGS. 1A and 1B.

The first irradiation unit EU1 radially emits the first irradiation light beam having the intensity varying in accordance with the irradiation direction. The second irradiation unit EU2 radially emits the second irradiation light beam having the intensity varying in accordance with the irradiation direction. The light receiving section RU receives a first reflected light beam caused by the object OB reflecting the first irradiation light beam from the first irradiation unit EU1, and a second reflected light beam caused by the object OB reflecting the second irradiation light beam from the second irradiation unit EU2. Subsequently, the detection section 50 detects the position POB of the object OB based on the light reception result in the light receiving section RU.

Specifically, the detection unit 50 detects the direction of the object OB with respect to the first irradiation unit EU1 as a first direction DDB1 (an angle $\theta 1$) based on the light reception result of the first reflected light beam. Further, the detection section 50 detects the direction of the object OB with respect to the second irradiation unit EU2 as a second direction DDB2 (an angle $\theta 2$) based on the light reception result of the second reflected light beam. Then, the position POB of the object OB is obtained based on the first direction DDB1 ($\theta 1$) and the second direction DDB2 ($\theta 2$) thus detected, and the distance DS between the first and second irradiation units EU1, EU2.

It should be noted that the emission control method according to the present embodiment is not limited to the method explained with reference to FIGS. 4 through 8, but can be put into practice with various modifications. For example, it is also possible to adopt a method of using the light emitting element LEDB shown in FIG. 8 as a light emitting element of a reference light source section. The reference light source section is a light source section disposed with a smaller distance from the light receiving section RU compared to the other light source sections (the light source sections LS1, LS2 shown in FIG. 9) or disposed inside the same housing as the light receiving section RU, for example, to thereby be set to be disposed so that the entrance of the surrounding light (e.g., the disturbance light and the reflected light beam from the object) is restricted. Further, the control section 60 lights the light source section LS1 and the reference light source section not shown alternately in the first period and performs the emission control of the light source section LS1 and the reference light source section so that the detected light reception amounts in the light receiving section RU become equal to each other. Further, the control section 60 lights the second light source section LS2 and the reference light source section alternately in the second period and performs the emission control of the second light source section LS2 and the reference light source section so that the detected light reception amounts in the light receiving section RU become equal to each other. According to such a process as described above, it results that the emission control is performed so that the detected light reception amount in the first emission period in which the light source section LS1 emits the light beam and the detected light reception amount in the second emission period in which the second light source section LS2 emits the light beam become substantially equal to each other via the reference light source section.

Further, it is also possible to use the reference light source section together with the light source sections LS11, LS12, LS21, and LS22 shown in FIG. 11. The reference light source section is a light source section disposed with a smaller distance from the light receiving section RU compared to the other light source sections (the light source sections LS11, LS12, LS21, and LS22) or disposed inside the same housing as the light receiving section RU, for example, to thereby be set to be disposed so that the entrance of the surrounding light (e.g., the disturbance light and the reflected light beam from the object) is restricted. Further, the control section 60 lights the first light source section LS11 shown in FIG. 11 and the reference light source section not shown alternately in the first period, and performs the emission control of the first light source section LS11 and the reference light source section so that the detected light reception amounts in the light receiving section RU become equal to each other. Further, the control section 60 lights the second light source section LS12 and the reference light source section alternately in the second period, and performs the emission control of the second light source section LS12 and the reference light source section so that the detected light reception amounts in the light receiving section RU become equal to each other. Further, the control section 60 lights the third light source section LS21 and the reference light source section alternately in the third period, and performs the emission control of the third light source section LS21 and the reference light source section so that the detected light reception amounts in the light receiving section RU become equal to each other. Further, the control section 60 lights the fourth light source section LS22 and the reference light source section alternately in the fourth period, and performs the emission control of the fourth light source section LS22 and the reference light source section so that the detected light reception amounts in the light receiving section RU become equal to each other. According to such a process as described above, it results that the emission control is performed so that the detected light reception amount in the first emission period in which the first light source section LS11 emits the light beam and the detected light reception amount in the second emission period in which the second light source section LS12 emits the light beam become substantially equal to each other via the reference light source section. Further, it results that the emission control is performed so that the detected light reception amount in the third emission period in which the third light source section LS21 emits the light beam and the detected light reception amount in the fourth emission period in which the fourth light source section LS22 emits the light beam become substantially equal to each other via the reference light source section.

It should be noted that although the present embodiment is hereinabove explained in detail, it should easily be understood by those skilled in the art that various modifications not substantially departing from the novel matters and the effects of the invention are possible. Therefore, such modified examples should be included in the scope of the invention. For example, a term described at least once with a different term having a broader sense or the same meaning in the specification or the accompanying drawings can be replaced with the different term in any part of the specification or the accompanying drawings. Further, the configurations and the operations of the optical position detection device, the electronic apparatus, and the display device are not limited to those explained in the present embodiment, but can be put into practice in variously modified forms.

The entire disclosure of Japanese Patent Application No. 2010-133675, filed Jun. 11, 2010 is expressly incorporated by reference herein.

What is claimed is:

1. A display device comprising:
a screen on which an image is displayed; and
a position detection device including
a light emitting section adapted to emit an irradiation light beam along the screen,
a plurality of light receiving sections adapted to receive a reflected light beam caused by an object reflecting the irradiation light beam, the plurality of light receiving sections having a proximal end light receiver and a distal end light receiver, and
a detection section adapted to detect position information of the object based on a light reception result of the plurality of light receiving sections, wherein
the plurality of light receiving sections are linearly arranged along a first direction perpendicular to the screen, each of the plurality of light receiving sections is located apart from the screen with a different distance between the screen and each of the plurality of light receiving sections, the proximal end light receiver is located closer to the screen than the distal end light receiver,
a first detection range in the first direction from which the distal end light receiver receives the reflected light beam is larger than a second detection range in the first direction from which the proximal end light receiver receives the reflected light beam,
the first detection range is not overlapped with the second detection range in the first direction, and
the position detection device has detection accuracy of the position information of the object varying in accordance with a position of the object in the first direction.

2. The display device according to claim 1, wherein the position detection device varies a detection period of the position information of the object in accordance with the position in the first direction.

3. The display device according to claim 2, wherein the shorter the distance between the object and the screen is, the shorter the position detection device set the detection period of the position information.

4. The display device according to claim 1, wherein the position detection device varies an intensity of the irradiation light beam in accordance with the position in the first direction.

5. The display device according to claim 4, wherein the longer the distance between the object and the screen is, the weaker the position detection device set the intensity of the irradiation light beam.

6. The display device according to claim 1, wherein the light receiving section includes amplifier sections adapted to amplify light reception detection signals from each of the plurality of light receiving sections, and the amplifier sections are different in gain from each other in accordance with the positions of the corresponding light receiving sections in the first direction.

7. The display device according to claim 1, wherein
each of the plurality of light receiving sections has an incident light restriction section adapted to restrict an incident light beam along the first direction, and
a restriction degree of the incident light restriction section of the proximal end light receiver is stronger than a restriction degree of the incident light restriction section of the distal end light receiver.

8. The display device according to claim 7, wherein
the incident light restriction section is a slit including first and second slits, and
a width of the first slit for the proximal end light receiver is narrower than a width of the second slit for the distal end light receiver.

9. A position detection device comprising:
a light emitting section adapted to emit an irradiation light beam along an X-Y plane of a screen on which an image is displayed;
a plurality of light receiving sections adapted to receive a reflected light beam caused by an object reflecting the irradiation light beam, the plurality of light receiving sections having a proximal end light receiver and a distal end light receiver; and
a detection section adapted to detect position information of the object based on a light reception result of the plurality of light receiving sections, wherein
the plurality of light receiving sections are linearly arranged along a Z-axis direction perpendicular to the X-Y plane, each of the plurality of light receiving sections is located apart from the screen with a different distance between the screen and each of the plurality of light receiving sections, the proximal end light receiver is located closer to the screen than the distal end light receiver,
a first detection range in the Z-axis direction from which the distal end light receiver receives the reflected light beam is larger than a second detection range in the Z-axis direction from which the proximal end light receiver receives the reflected light beam,
the first detection range is not overlapped with the second detection range in the Z-axis direction, and
detection accuracy of the position information of the object varies in accordance with a Z-coordinate position of the object in the Z-axis direction.

10. The position detection device according to claim 9, wherein
a detection period of the position information of the object varies in accordance with the position in the Z-axis direction.

11. The position detection device according to claim 9, wherein
an intensity of the irradiation light beam varies in accordance with the position in the Z-axis direction.

12. An electronic apparatus comprising the optical position detection device according to claim 9.

13. An electronic apparatus comprising the optical position detection device according to claim 10.

14. An electronic apparatus comprising the optical position detection device according to claim 11.

* * * * *